(12) United States Patent
Myers, Jr.

(10) Patent No.: US 6,561,114 B2
(45) Date of Patent: May 13, 2003

(54) SYSTEM AND METHOD FOR TOWING A SHELLFISH DREDGE

(76) Inventor: Arthur R. Myers, Jr., 2637 Pamlico Loop, Virginia Beach, VA (US) 23456

( * ) Notice: Subject to any disclaimer, the term of this patent is extended or adjusted under 35 U.S.C. 154(b) by 0 days.

(21) Appl. No.: 09/968,533

(22) Filed: Oct. 2, 2001

(65) Prior Publication Data

US 2003/0061978 A1 Apr. 3, 2003

(51) Int. Cl.$^7$ ............................................. B63B 21/66
(52) U.S. Cl. ........................................................ 114/244
(58) Field of Search ........................ 114/244, 245, 114/253, 179

(56) References Cited

U.S. PATENT DOCUMENTS

| | | |
|---|---|---|
| 753,168 A | 2/1904 | Scott |
| 1,070,271 A | 8/1913 | Lybeck |
| 1,387,590 A | 8/1921 | Collier |
| 2,407,850 A | 9/1946 | Seifried |
| 2,508,087 A | 5/1950 | Bailey |
| 2,648,918 A | 8/1953 | Mazzella |
| 3,184,866 A | 5/1965 | McMillin |
| 3,226,854 A | 1/1966 | Mero |
| 3,407,577 A | 10/1968 | Fiske |
| 3,462,858 A | 8/1969 | Francklyn |
| 3,521,386 A | 7/1970 | Francklyn |
| 3,624,932 A | 12/1971 | Doyle |
| 3,672,322 A | * 6/1972 | Van Der Linde ........... 114/245 |
| 3,783,535 A | 1/1974 | Hanks |
| 4,270,479 A | * 6/1981 | Baker et al. ................. 102/211 |
| 4,425,723 A | 1/1984 | Erlandsen |
| 4,464,851 A | 8/1984 | Collier |
| 4,726,315 A | 2/1988 | Bell et al. |
| 5,024,009 A | 6/1991 | Kirkman |
| 5,855,179 A | 1/1999 | Wood |
| 6,009,042 A | 12/1999 | Workman et al. |
| 6,237,259 B1 | 5/2001 | Myers, II |

FOREIGN PATENT DOCUMENTS

GB        1156547        6/1969

* cited by examiner

Primary Examiner—Jesus D. Sotelo
(74) Attorney, Agent, or Firm—Bacon & Thomas

(57) ABSTRACT

A system and method for towing an object below a vessel that includes a tow line anchor or attachment point situated on a deck of the vessel, a passage extending through the vessel to an opening at the bottom or keel of the vessel, and a tow line that extends from the anchor or attachment point through the vessel, and that exits the vessel through the opening at the bottom of the vessel. The anchor or attachment point may be part of a windlass that enables the tow line to be raised or lowered within the passage.

13 Claims, 1 Drawing Sheet

SYSTEM AND METHOD FOR TOWING A SHELLFISH DREDGE

BACKGROUND OF THE INVENTION

1. Field of the Invention

This invention relates generally to a system and method for towing an object beneath a marine vessel, and more specifically to a system and method for towing a shellfish dredging apparatus of the type used to extract bottom-dwelling shellfish such as clams, oysters, mussels, cockles, and crabs from a sea, lake, or riverbed.

2. Description of Related Art

Dredging apparatus designed to be towed along the bottom of a body of water in order to harvest shellfish that live in colonies at the bottom have been in use since prehistoric times. All of these devices seek to dredge shellfish such as clams, oysters, cockles, mussels, and/or crabs from the bottom of the body of water, and either trap the shellfish for retrieval after the device is brought to the surface, or continuously transport the shellfish to the surface as the dredge is being towed along the bottom.

An especially efficient example of a shellfish dredging apparatus of the type used to extract shellfish and continuously transport them to the surface while the dredging apparatus is being towed is disclosed in U.S. Pat. No. 6,237,259, commonly assigned with the present application and incorporated by reference herein. In the dredging apparatus disclosed in this patent, harvesting is carried out by a sled towed and equipped with hydraulic lines that direct pressurized water rearwardly relative to the direction of travel of the sled. The pressurized water sweeps sediments and shellfish towards a separator device that separates the shellfish from the sediments, after which the pressurized water sweeps the separated shellfish towards a suction chamber where the pressurized water creates a Venturi effect, causing shellfish entering the chamber to be transported to the surface through a trunk line.

Other examples of shellfish dredging equipment designed to harvest shellfish while being towed along the bottom of a body of water include those disclosed in U.S. Pat. Nos. 2,508,087, 3,184,866 3,462,858, 3,521,386, 3,624,932, and 4,464,851, and in British Patent Publication No. 1,156,547.

One aspect of shellfish dredging that is not addressed by the above-cited patents, including U.S. Pat. No. 6,237,259, is the manner in which the dredging apparatus is maneuvered along the bottom. While the dredging apparatus itself may be relatively small and easily handled, it may be towed at depths of tens or hundreds of feet below the surface. Due to the inherent slack in the tow line, a relatively large turning motion of the towing vessel is required to move the dredging apparatus in a lateral direction to avoid obstacles, which is particularly disadvantageous when the towing vessel is a relatively large commercial fishing boat capable of handling and storing large quantities of shellfish and the shellfish beds are located in bays or inlets having a variable seabed topography and little surface room to maneuver.

Conventionally, the tow line and the hydraulic and/or shellfish transporting trunk lines are suspended from booms or spars at the side of the vessel, or simply draped over the side of the deck. Towing from the rear is impractical because the rear of the vessel generally serves at the fulcrum for turning of the vessel and thus requires greater forward movement on the part of the vessel to achieve a desired lateral motion of the dredging apparatus.

In a relatively small vessel with a relatively short tow line that can be pulled up manually, it is of course possible to simply attach the tow line to the front of the vessel, as illustrated in U.S. Pat. No. 3,783,535. However, for a tow line of typical length that is to be paid out from a winch or windlass on the deck of a commercial fishing vessel, towing from the front of the vessel in which the tow line is not suspended from a boom or spar is essentially impossible. The tow line will most likely be pulled to the side of the vessel so that it extends from the winch or windlass in the manner illustrated in U.S. Pat. No. 3,624,932, or it will have to traverse the bow of the vessel each time the vessel changes turning direction. On the other hand, suspending the tow line from a boom or spar at the front of the vessel so that the tow line clears the bow can present a hazard to persons on deck should the tow line not stay in front of the vessel, and furthermore has the disadvantage of lengthening the tow line, resulting in a decreased mechanical advantage, i.e., a decreased lateral displacement of the dredge for a given lateral displacement of the bow of the vessel.

SUMMARY OF THE INVENTION

It is accordingly a first objective of the invention to provide a method and system for towing a shellfish dredging apparatus, and any other device or object typically towed by a boat below the surface of the boat, that provides increased maneuverability of the shellfish dredging apparatus or other object being towed.

It is a second objective of the invention to provide a method and system for towing an object beneath a marine vessel, such as a shellfish dredging apparatus, scientific instrument, non-shellfish dredging equipment, underwater salvage apparatus, sonar device, robot, or the like, that enables the tow line to extend from the front of the vessel while minimizing the length of the tow line and without interference from the bow of the vessel, and yet that permits the tow line to be paid out or drawn in from a winch or windlass located on the deck of the vessel.

These objectives are accomplished by providing a system for towing an object below a vessel that includes an anchor or attachment point situated on a deck of the vessel, a passage extending through the vessel to an opening at the bottom or keel of the vessel, and a tow line that extends from the attachment point through the vessel, and that exits the vessel through the opening at the bottom or keel of the vessel.

The objective of the invention is also accomplished by a method of towing an object below a vessel that includes the step of anchoring a tow line to a deck of the vessel, and running the tow line through a passage in the vessel so that it exits the vessel through an opening at the bottom or keel of the vessel.

Preferably, the tow line exits the vessel as close to the bow as possible, although the principles of the invention extend, with decreasing effectiveness, to tow lines situated anywhere from the bow to points aft of the center of the vessel. In addition, the tow line will normally be secured to a winch or windlass that controls the amount of slack in the tow line and that enables the towed object to be raised and lowered, and the passage preferably slopes aft from the deck to the opening at the bottom of the vessel.

In an especially preferred embodiment of the invention, the object towed is a shellfish dredge of the general type disclosed in U.S. Pat. No. 6,237,259, and the tow line is preferably in the form of a one-inch stud link chain that extends through the passage and is controlled on the top side of the vessel by a chain windlass. The hydraulic lines associated with the dredge disclosed in U.S. Pat. No. 6,237,259 may extend over the side of the vessel in conventional fashion.

While it might seem that the increase in towing efficiency provided by the invention is trivial, the advantages of such an increase are significant. First, increased maneuverability of the dredging apparatus enables obstacles to be more easily avoided, decreasing the risk of collision with the obstacle, and at the same time enables greater towing speed and better coverage of the shellfish bed. Second, the greater towing speed and maneuverability made possible by the system and method of the invention results in a decrease in fuel consumption and man-hours required to harvest the available shellfish. Third, confining the tow line to a passage through the vessel eliminates safety hazards resulting from a free tow line.

In an age of decreasing catches and ever increasing costs, the ability to harvest even an incrementally greater amount of shellfish in an incrementally shorter time using less fuel and with optimal safety could make the difference between the continued viability of a commercial shellfish harvesting venture and a world where clambakes, crab feasts, and oysters on the half shell are only a memory.

DETAILED DESCRIPTION OF THE PREFERRED EMBODIMENT

Figure 1:
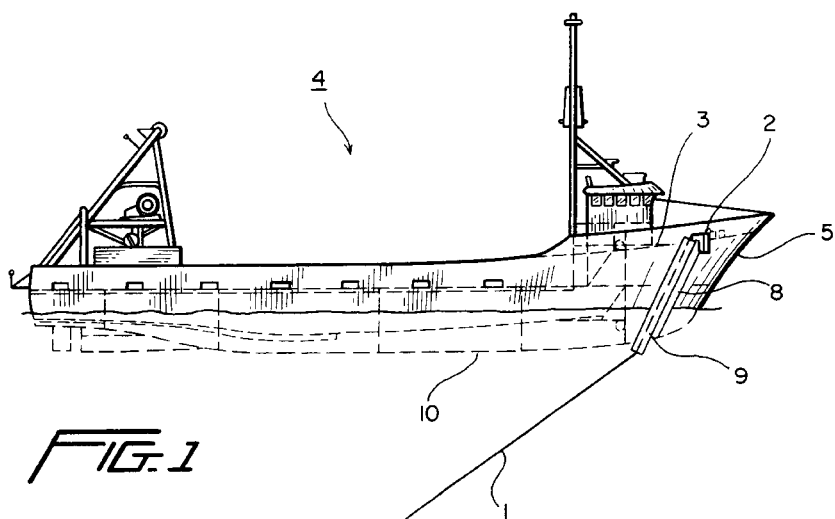
FIG. 1 is a side view of a fishing vessel outfitted with a towing system arranged according to the principles of a preferred embodiment of the invention.

As illustrated in FIG. 1, the towing system of the preferred embodiment of the invention includes a tow line 1 and attachment means for securing the tow line to an object or device 2 on the deck 3 of a vessel 4. The object or device 2 to which the tow line is secured is preferably situated near the bow 5 of the vessel.

In the illustrated example of a commercial fishing vessel and shellfish dredging apparatus 6, tow line 1 may be in the form of a 1-inch stud link chain, and object or device 2 may be the form of a chain windlass that enables the tow line to be raised and lowered while towing the dredging apparatus 6 along the bottom 7 of a body of water, thereby taking up excess slack or lowering the tow line.

While the preferred tow line is a chain, it will be appreciated that details of the tow line may be varied, and that alternative tow lines as ropes, cables, or chains of different sizes may be substituted depending on the requirements of the dredging apparatus being towed.

According to the principles of the preferred embodiment, the tow line extends through a passage 8 in the center of vessel 1, when the vessel is viewed from the bow or stern, all the way from deck 3 to an opening 9 in the bottom or keel of the vessel. A bearing surface or bearings may be provided at opening 9 and elsewhere along the passage 8 to facilitate movement of the tow line in response to rotation of windlass 2. In addition, the passage 8 may be defined, at least in part, by one or more tubes, cylinders, and/or ducts, and the passage may be straight or include curves or angles, and/or the passage may simply extend through the open interior of the vessel.

Dredging apparatus 6 may be a sled of the type disclosed in U.S. Pat. No. 6,237,259, including hydraulic lines (not shown) for supplying an excavating water jet to the sled and for lifting shellfish to the surface. To accommodate the tow line, passage 8 may have a ten-inch diameter, although those skilled in the art will appreciate that the diameter or size of the passage may be freely varied, either by increasing or decreasing the size of the passage, without departing from the scope of the invention. In addition, those skilled in the art will appreciate that the type of object that is being towed may also be freely varied without departing from the scope of the invention, for example by substituting other types of shellfish dredging apparatus, whether for shellfish or not, scientific instruments, underwater salvage equipment, robots, sonar devices, and the like.

To optimize maneuvering of the tow line 1, passage 8 slopes or is inclined in an aftward direction from the deck 3 to opening 9. The angle of inclination may, for example, be 20 degrees from vertical. While the exact position of attachment point 2 is not necessarily critical, the opening 9 should be situated as close to the bow of the vessel as possible. Less maneuverability is provided if the passage is situated further aft on the vessel, although such positioning would still be within the scope of the invention, as would a different angle of inclination of the passage.

Figure 2:
FIG. 2 is a flowchart of a towing method according to the preferred embodiment of the invention.

Finally, as illustrated in FIG. 2, the method of the invention simply involves the steps of securing a tow line to a device or anchor on the deck of the vessel (step 100), and running the tow line through a passage in the vessel and out through an opening at the bottom or keel of the vessel (step 200).

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention. Consequently, it is intended that the invention not be limited by the above description or accompanying drawings, but that it be defined solely in accordance with the appended claims.

What is claimed is:

1. A system for towing an object beneath a marine vessel, comprising:
   a passage extending from a deck of the vessel to an opening in a bottom of the vessel; and
   a tow line extending:
   a. from the deck through the passage,
   b. from the passage through the opening in the bottom of the vessel, and
   c. from the opening in the bottom of the vessel to the object being towed.

2. A system as claimed in claim 1, wherein said passage is situated adjacent a bow of the vessel.

3. A system as claimed in claim 1, wherein said passage slopes aft from said deck to said opening in the bottom of said vessel.

4. A system as claimed in claim 1, wherein said tow line is a chain.

5. A system as claimed in claim 4, wherein said tow line is secured to a chain windlass on said deck.

6. A system as claimed in claim 1, wherein said tow line is secured to a windlass on said deck.

7. A system as claimed in claim 1, wherein said vessel is a fishing vessel.

8. A system as claimed in claim 1, wherein said object is a dredging apparatus.

9. A system as claimed in claim 8, wherein said object is a shellfish dredging apparatus.

10. A method of towing an object beneath a marine vessel, comprising the steps of:
- securing a first end of the tow line to a deck of the vessel and a second end of the tow line to the object;
- running the tow line:
  - a. from the deck through a passage in the vessel,
  - b. from the passage out through an opening in a bottom of the vessel, and
  - c. from the opening the opening in the bottom of the vessel to the object being towed.

11. A method of towing as claimed in claim 10, further comprising the step of using a windlass positioned on said deck to raise and lower said object as the object is being towed.

12. A method as claimed in claim 10, wherein said passage is situated adjacent a bow of the vessel.

13. A system for towing a dredging apparatus beneath a marine vessel, comprising:
- a passage extending from a deck of the vessel to an opening in a bottom of the vessel, wherein said passage is situated adjacent a bow of the vessel; and
- a tow line extending:
  - a. from the deck through the passage,
  - b. from the passage through the opening in the bottom of the vessel, and
  - c. from the opening in the bottom of the vessel to the dredging apparatus.

* * * * *